(12) United States Patent
Yang et al.

(10) Patent No.: US 7,978,293 B2
(45) Date of Patent: Jul. 12, 2011

(54) LIQUID CRYSTAL DISPLAY

(75) Inventors: Young-Chol Yang, Seongnam-si (KR);
Sung-Woon Kim, Suwon-si (KR);
Jiangang Lu, Suwon-si (KR);
Seung-Hoon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 357 days.

(21) Appl. No.: 12/151,743

(22) Filed: May 7, 2008

(65) Prior Publication Data
US 2008/0284959 A1 Nov. 20, 2008

(30) Foreign Application Priority Data

May 15, 2007 (KR) .................. 10-2007-0047266

(51) Int. Cl.
*G02F 1/1333* (2006.01)
(52) U.S. Cl. ....................... 349/141; 349/129
(58) Field of Classification Search ........... 349/128–132
See application file for complete search history.

(56) References Cited

U.S. PATENT DOCUMENTS

| | | | |
|---|---|---|---|
| 2003/0067572 A1 | 4/2003 | Umeda et al. | |
| 2005/0056811 A1 | 3/2005 | Nishikawa et al. | |
| 2005/0140876 A1* | 6/2005 | Kubo | 349/114 |
| 2006/0290854 A1 | 12/2006 | Hisatake | |
| 2008/0106689 A1* | 5/2008 | Inoue et al. | 349/181 |
| 2009/0273740 A1* | 11/2009 | Yoshizawa | 349/75 |

FOREIGN PATENT DOCUMENTS

| | | |
|---|---|---|
| JP | 7-146477 | 6/1995 |
| JP | 8-283718 | 10/1996 |
| JP | 9-318921 | 12/1997 |
| JP | 2004-300420 | 10/2004 |
| JP | 2006-124666 | 5/2006 |
| JP | 2007-45806 | 2/2007 |
| KR | 2004-0102862 | 12/2004 |
| KR | 2005-0004455 | 1/2005 |
| KR | 2006-0051668 | 5/2006 |

OTHER PUBLICATIONS

Patent Abstracts of Japan, Publication No. 07-146477, Jun. 6, 1995, 1 p.
Patent Abstracts of Japan, Publication No. 08-283718, Oct. 29, 1996, 1 p.

(Continued)

*Primary Examiner* — David Nelms
*Assistant Examiner* — Phu Vu
(74) *Attorney, Agent, or Firm* — Innovation Counsel LLP

(57) ABSTRACT

A liquid crystal display including an upper panel having an upper alignment layer, a lower panel having a lower alignment layer, and a liquid crystal layer including liquid crystal molecules interposed between the upper panel and the lower panel. Each of the liquid crystal molecules has different refractive indexes and different permittivities with respect to each axis direction. The upper alignment layer and the lower alignment layer are vertical alignment layers and have a rubbing direction, respectively. Before the application of an electric field, a first axis of each liquid crystal molecule is aligned in a vertical direction by the vertical alignment layer, and a second axis of each liquid crystal molecule is aligned in a direction parallel to the rubbing direction, and, after the application of the electric field, one having the largest permittivity of the axis directions of the liquid crystal molecule is aligned in parallel to the applied electric field.

10 Claims, 17 Drawing Sheets

Reference state

OTHER PUBLICATIONS

Patent Abstracts of Japan, Publication No. 09-318921, Dec. 12, 1997, 1 p.

Patent Abstracts of Japan, Publication No. 2004-300420, Oct. 28, 2004, 1 p.

Patent Abstracts of Japan, Publication No. 2006-124666, May 18, 2006, 1 p.

Patent Abstracts of Japan, Publication No. 2007-045806, Feb. 22, 2007, 1 p.

Korean Patent Abstracts, Publication No. 1020040102862, Dec. 8, 2004, 1 p.

Korean Patent Abstracts, Publication No. 1020050004455, Jan. 12, 2005, 1 p.

Korean Patent Abstracts, Publication No. 1020060051668, May 19, 2006, 1 p.

* cited by examiner

FIG.7

Final state

FIG.19

LIQUID CRYSTAL DISPLAY

CROSS-REFERENCE TO RELATED APPLICATION

This application claims priority to and the benefit of Korean Patent Application No. 10-2007-0047266 filed in the Korean Intellectual Property Office on May 15, 2007, the entire contents of which are incorporated herein by reference.

BACKGROUND OF THE INVENTION (a) Field of the Invention

The present invention relates to a liquid crystal display using biaxial liquid crystals.

(b) Description of the Related Art

Generally, liquid crystal displays (LCDs) which are one of flat displays that are widely used include a pair of panels including field generating electrodes such as a plurality of pixel electrodes and a common electrode, and a liquid crystal (LC) layer having dielectric anisotropy is interposed between the panels. The LCDs generate an electric field in the LC layer by applying voltages to the field generating electrodes, and obtain desired images by controlling the strength of the electric field to vary the transmittance of light incident on the LC layer.

In general, the LCD is manufactured using uniaxial liquid crystal. The uniaxial liquid crystal has a characteristic that refractive index values with respect to two of three axis direction are the same.

Due to a reflective index difference between the two axis directions and the remaining axis direction, light passing through the uniaxial liquid crystal has a different retardation for every axis direction, and thereby a polarization component of the light is changed. Since the alignment of the uniaxial liquid crystal is changed based on the electric field, the polarization component of the light is varied by adjusting the electric field.

Since values of the refractive index considered in manufacturing the LCD using the uniaxial liquid crystal are two, it is easy to adjust the polarization component of the light using the electric field.

However, when an LCD uses the uniaxial liquid crystal, the liquid crystal material is limited, and it is also difficult to manufacture various types of LCDs.

SUMMARY OF THE INVENTION

According to an embodiment of the present invention, a liquid crystal display is provided, which includes an upper panel including an upper alignment layer, a lower panel including a lower alignment layer, and a liquid crystal layer interposed between the upper panel and the lower panel and including liquid crystal molecules. Each of the liquid crystal molecules has different refractive indexes and different permittivities with respect to each axis direction, and the upper alignment layer and the lower alignment layer are vertical alignment layers and have a rubbing direction, respectively. Before the application of an electric field, a first axis of a liquid crystal molecule is aligned in a vertical direction by the vertical alignment layer and a second axis of the liquid crystal molecule is aligned in a direction parallel to the rubbing direction, and after the application of the electric field, one having the largest permittivity of the axis directions of the liquid crystal molecule is aligned in parallel to the applied electric field.

The electric field may be applied in a vertical direction.

The upper panel and the lower panel may further include a retardation plate and a polarizer, respectively.

The electric field may be applied in a horizontal direction and in a direction parallel to the rubbing direction.

The electric field may be applied in a horizontal direction and in a direction perpendicular to the rubbing direction.

The liquid crystal molecule may be tilted by a bias angle with respect to an application direction of the electric field before the application of the electric field.

According to another embodiment of the present invention, a liquid crystal display is provided, which includes an upper panel including an upper alignment layer, a lower panel including a lower alignment layer, and a liquid crystal layer interposed between the upper panel and the lower panel and including liquid crystal molecules. Each of the liquid crystal molecules has different refractive indexes and different permittivities with respect to each axis direction, and the upper alignment layer and the lower alignment layer are vertical alignment layers and have a rubbing direction, respectively. Before the application of an electric field, a first axis of a liquid crystal molecule is aligned in a vertical direction by the vertical alignment layer and a second axis of the liquid crystal molecule is aligned in a direction perpendicular to the rubbing direction, and after the application of the electric field, one having the largest permittivity of the axis directions of the liquid crystal molecule is aligned in parallel to the applied electric field.

The electric field may be applied in a vertical direction.

A fringe field may be generated in at least one portion of the electric field.

The upper panel and the lower panel may further include a retardation plate and a polarizer, respectively.

The electric field may be applied in a horizontal direction and in a direction parallel to the rubbing direction.

The liquid crystal molecule may be tilted by a bias angle with respect to an application direction of the electric field before the application of the electric field.

The electric field may be applied in a horizontal direction and in a direction perpendicular to the rubbing direction.

According to further another embodiment of the present invention, a liquid crystal display is provided, which includes an upper panel including an upper alignment layer, a lower panel including a lower alignment layer, and a liquid crystal layer interposed between the upper panel and the lower panel and including liquid crystal molecules. Each of the liquid crystal molecules has different refractive indexes and different permittivities with respect to each axis direction, and the upper alignment layer and the lower alignment layer are horizontal alignment layers and have a rubbing direction, respectively. Before the application of an electric field, a first axis of the liquid crystal molecule is aligned in a horizontal direction by the horizontal alignment layer and along the rubbing direction and a second axis of the liquid crystal molecule is aligned in a direction parallel to the upper panel or the lower panel, and after the application of the electric field, one having the largest permittivity of the axis directions of the liquid crystal molecule is aligned in parallel to the applied electric field.

The electric field may be applied in a vertical direction.

A fringe field may be generated in at least one portion of the electric field.

The upper panel and the lower panel may further include a retardation plate and a polarizer, respectively.

The electric field may be applied in a horizontal direction and in a direction parallel to the rubbing direction.

The liquid crystal molecule may be tilted by a bias angle with respect to an application direction of the electric field before the application of the electric field.

The electric field may be applied in a horizontal direction and in a direction perpendicular to the rubbing direction.

According to further another embodiment of the present invention, a liquid crystal display is provided, which includes an upper panel including an upper alignment layer, a lower panel including a lower alignment layer, and a liquid crystal layer interposed between the upper panel and the lower panel and including liquid crystal molecules. Each of the liquid crystal molecules has different refractive indexes and different permittivities with respect to each axis direction, and the upper alignment layer and the lower alignment layer are horizontal alignment layers and have a rubbing direction, respectively. Before the application of an electric field, a first axis of the liquid crystal molecule is aligned in a horizontal direction by the horizontal alignment layer and along the rubbing direction and a second axis of the liquid crystal molecule is aligned in a direction perpendicular to the upper panel or the lower panel, and after the application of the electric field, one having the largest permittivity of the axis directions of the liquid crystal molecule is aligned in parallel to the applied electric field.

The electric field may be applied in a vertical direction.

The electric field may be applied in a horizontal direction and in a direction parallel to the rubbing direction.

The upper panel and the lower panel may further include a retardation plate and a polarizer, respectively.

The electric field may be applied in a horizontal direction and in a direction perpendicular to the rubbing direction.

The liquid crystal molecule may be tilted by a bias angle with respect to an application direction of the electric field before the application of the electric field.

The upper panel and the lower panel may further include a retardation plate and a polarizer, respectively.

Accordingly to still further embodiment of the present invention, a liquid crystal display is provided, which includes an upper panel, a lower panel, and a liquid crystal layer interposed between the upper panel and the lower panel and comprising liquid crystal molecules. Each of the liquid crystal molecules has different refractive indexes and different permittivities with respect to each axis direction. One having the largest permittivity of the axis directions of a liquid crystal molecule is rotated on the basis of a direction of an electric field applied to the liquid crystal layer and a rubbing direction for aligning the liquid crystal molecules of the liquid crystal layer.

The direction of the electric field may be perpendicular to the upper panel and the lower panel.

The direction of the electric field may be parallel to the upper panel and the lower panel.

The liquid crystal molecule may be aligned in a direction perpendicular to the upper panel and the lower panel in an initial state.

The liquid crystal molecule may be aligned in a direction parallel to the upper panel and the lower panel in an initial state.

BRIEF DESCRIPTION OF THE DRAWINGS

Exemplary embodiments of the present invention are described below in detail with reference to the accompanying drawings for clear understanding of advantages of the present invention, wherein:

FIG. 7 shows alignment variations of the liquid crystal molecule having a permittivity relationship with respect to each axis direction as shown in FIG. 6;

FIG. 19 shows alignment variations of the liquid crystal molecule having a permittivity relationship with respect to each axis direction as shown in FIG. 18.

DETAILED DESCRIPTION OF THE EMBODIMENTS

Figure 1:
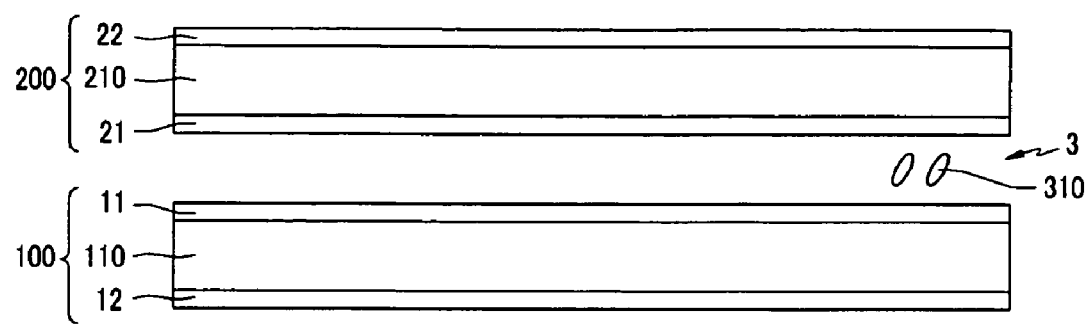
FIG. 1 is a sectional view of an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, relative terms, such as "lower" or "bottom" and "upper" or "top" may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on the "upper" side of the other elements. The exemplary term "lower" can therefore encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can therefore encompass both an orientation of above and below. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Exemplary embodiments of the present invention are described herein with reference to cross-sectional illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

An exemplary LCD according to an exemplary embodiment of the present invention will now be described with reference to FIG. 1.

An exemplary LCD according to an exemplary embodiment of the present invention includes an upper panel 200, a lower panel 100, and a biaxial liquid crystal layer 3 interposed between the lower panel 100 and the upper panel 200 and having liquid crystal molecules 310. The upper panel 200 and the lower panel 100 include an upper substrate 210 and a lower substrate 110, respectively, each of which has constituent elements. In detail, polarizers 22 and 12 are attached on outsides of the upper substrate 210 and the lower substrate 110, respectively, and alignment layers 21 and 11 are formed on insides of the upper substrates 210 and the lower substrate 110, respectively. Directions of transmissive axes of the polarizers 12 and 22 are perpendicular to each other. However, this is not limited, and the directions of the transmissive axes of the polarizers 12 and 22 may be parallel or form a predetermined angle (for example, about 45 degrees). In addition, the alignment layers 11 and 21 may be formed to have various alignment directions based on an initial alignment direction of the liquid crystal molecules 310 of the liquid crystal layer 3. The alignment layers 11 and 21 are layers for initially aligning the liquid crystal molecules 310 of the liquid crystal layer 3 in a predetermined direction. The alignment direction of the liquid crystal molecules 310 may be formed on the alignment layers 11 and 21 by the well known rubbing operation, or by irradiating light in the predetermined direction. In this embodiment, it is assumed that the alignment directions of the alignment layers 11 and 21 are formed by the rubbing operation. However, the alignment directions of the alignment layers 11 and 21 may be formed by other manners such as with light.

The LCD further includes well known field generating electrodes as described below. The field generating electrodes include a common electrode that is supplied with a common voltage, and a plurality of pixel electrode that are supplied with data voltages. Magnitudes of the data voltages are varied based on grays of an image to be displayed. The common electrode and one pixel electrode form a pair to operate.

When the LCD uses a vertical electric field, the pixel electrodes and the common electrode are formed on different substrates, respectively. However, when the LCD uses a horizontal electric field, the pixel electrodes and the common electrode are formed on the same substrate with an insulating layer therebetween. The pixel electrodes and the common electrode may have various structures. When using the vertical electric field, the common electrode is entirely formed on one of the two substrates 210 and 110, and one pixel electrode is formed for every pixel. In addition, an LCD with the vertical electric field may include pixel electrodes with a plurality of openings formed therein corresponding to the common electrode, and the pixel electrodes may have a predetermined shape, to improve the performance characteristics of the LCD.

When using a horizontal electric field, the pixel electrodes and the common electrode are alternately formed in a linear shape. Alternatively, the common electrode may be integrally formed on one of the two substrates 210 and 110, and only the pixel electrodes may be formed in a linear shape.

For color display, the LCD may further include color filters. The color filters are formed on the upper panel 200 or the lower panel 100. For preventing light leakage between adjacent pixels, a light blocking member such as a black matrix may be formed on the LCD.

According to a display manner of an image, the LCD may include retardation plates between the substrates 110 and 210 and the polarizers 12 and 22, respectively. The retardation films generally used is a $\lambda/4$ plate, a $\lambda/2$ plate, a compensation film, etc. The retardation films retard light having a predetermined polarization direction, to improve image quality.

Characteristics of the liquid crystal molecules 310 of the liquid crystal layer 3 will be described with reference to FIG. 2.

Figure 2:
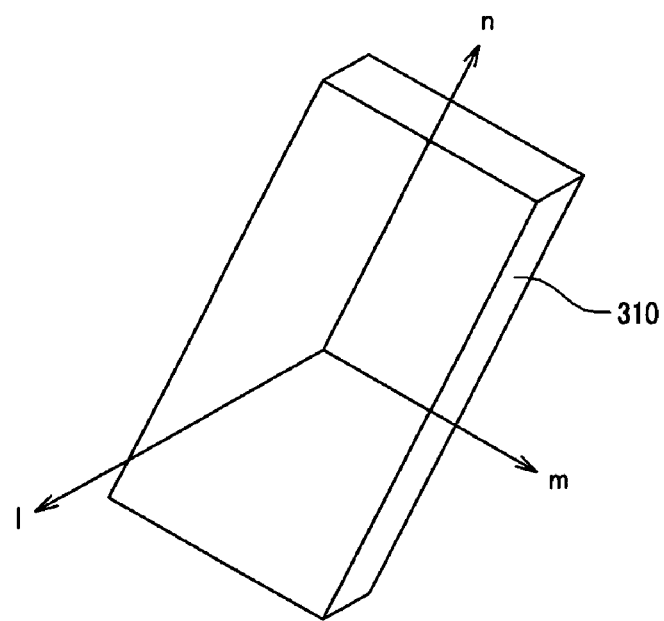
FIG. 2 is a perspective view of a biaxial liquid crystal molecule according to an exemplary embodiment of the present invention.

FIG. 2 is a perspective view of a biaxial liquid crystal molecule 310 according to an exemplary embodiment of the present invention.

Each of the liquid crystal molecules 310 according to an exemplary embodiment of the present invention has a biaxial characteristic. That is, the liquid crystal molecule 310 has a different refractive index with respect to each of l-axis, m-axis, and n-axis directions. Therefore, each polarization component of incident light is always supplied with different retardation.

Values of the permittivities ($\epsilon$) of the liquid crystal molecule (referred to as "the biaxial liquid crystal molecule") 310 that has the biaxial characteristic with respect to each of the l-axis, m-axis, and n-axis directions are at least 2 for each. Values of the permittivities ($\epsilon$) of the biaxial liquid crystal molecule 310 with respect to the respective l-axis, m-axis, and n-axis directions also differ.

Referring to FIG. 2, one liquid crystal molecule 310 has a cuboidal shape, of which sides have different lengths. Regardless of an actual structure of the liquid crystal molecule 310, it helps to understand that the liquid crystal molecule 310 has different refractive indexes and permittivities with respect to the l-axis, m-axis, and n-axis directions.

Figure 3:
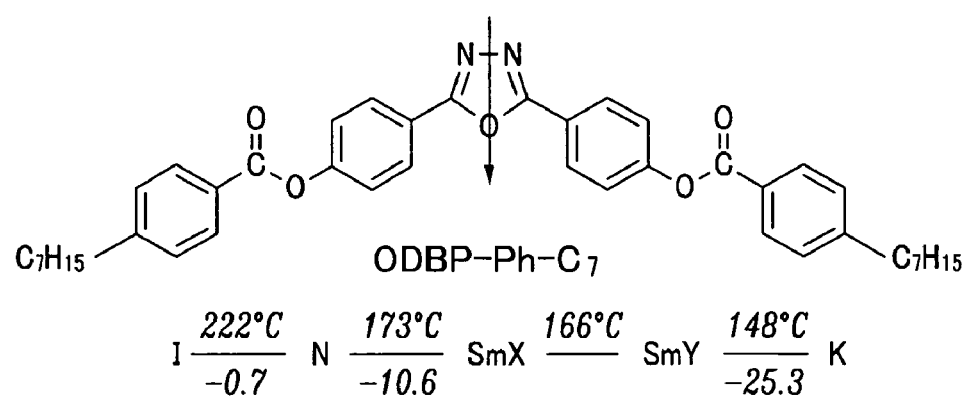
FIG. 3 shows a chemical structure of a biaxial liquid crystal molecule according to an exemplary embodiment of the present invention.

The actual structure of the liquid crystal molecule 310 may be varied in accordance with the biaxial material used. In FIG. 3, a chemical structure of the biaxial liquid crystal molecule according to an exemplary embodiment is shown. Referring to FIG. 3, the chemical structure of the biaxial liquid crystal molecule 310 has a bent shape. Alternatively, the chemical structure of the biaxial liquid crystal molecule 310 may various shapes such as a crossed shape.

Figure 4:
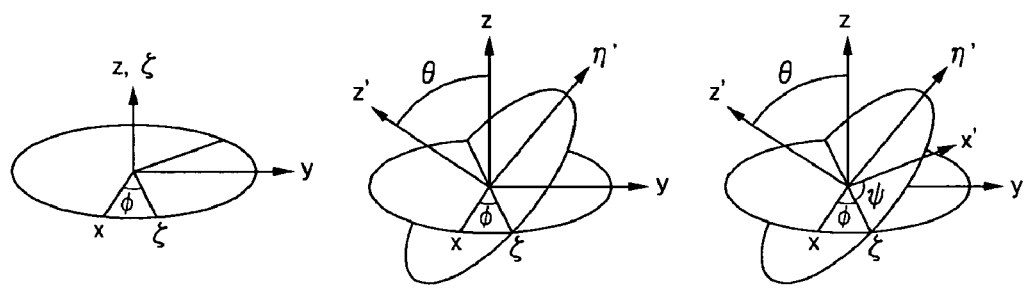
FIG. 4 are diagrams showing angles according to a Euler rotation.

FIG. 4 shows diagrams of angles according to a Euler rotation. The angles according to the Euler rotation need to be described with respect to a rotation of the liquid crystal molecule 310, and therefore are described below.

First, an angle of rotation with respect to a z-axis is referred to as $\phi$. An angle of rotation with respect to a x'-axis that is rotated by $\phi$ is referred to as $\theta$. An angle of rotation with respect to a z'-axis that is rotated by $\theta$ is referred to as $\psi$.

Angles $\phi$, $\theta$, and $\psi$ used hereinafter are generated based on the Euler rotation shown in FIG. 4.

Before the description of alignment variations of the liquid crystal molecules in the LCD using the biaxial liquid crystal molecules, the characteristics of the liquid crystal molecules will be described.

A movement of the biaxial liquid crystal molecule may be forecast by a continuum theory. A free energy density with respect to an elastic deformation of the liquid crystal molecule in accordance with the continuum theory is expressed by Equation 1.

$$f_d(r) = k_1(n \cdot (\nabla \times n)) + k_2(m \cdot (\nabla \times m)) + k_3(l \cdot (\nabla \times l)) + \quad \text{[Equation 1]}$$
$$\frac{1}{2}K_{1n}(\nabla \cdot n)^2 + \frac{1}{2}K_{2n}(n \cdot (\nabla \times n))^2 + \frac{1}{2}K_{3n}(n \times (\nabla \times n))^2 +$$
$$\frac{1}{2}K_{1m}(\nabla \cdot m)^2 + \frac{1}{2}K_{2m}(m \cdot (\nabla \times m))^2 +$$
$$\frac{1}{2}K_{3m}(m \times (\nabla \times m))^2 + \frac{1}{2}K_{1l}(\nabla \cdot l)^2 + \frac{1}{2}K_{2l}(l \cdot (\nabla \times l))^2 +$$
$$\frac{1}{2}K_{3l}(l \times (\nabla \times l))^2 + \frac{1}{2}K_{nl}(n \cdot (\nabla \times l))^2 +$$
$$\frac{1}{2}K_{mn}(m \cdot (\nabla \times n))^2 + \frac{1}{2}K_{lm}(l \cdot (\nabla \times m))^2$$

In Equation 1, it is known that the numerical expressions of the first line are defined by chirality of the liquid crystal molecule, the numerical expressions of the second line to the fourth line are defined by a splay deformation, a twist deformation, and a bend deformation with respect to each of the l-axis, m-axis, and n-axis directions, and the numerical expressions of the last line are defined by couplings between liquid crystal molecules.

The constants (K values) in Equation 1 are elastic constants, and as the values of the elastic constants increase, the corresponding deformations become difficult.

As described above, the free energy density is dependent on the characteristics of the liquid crystal molecule, and the free energy densities between LCDs may differ. However, it is assumed that the free energy densities of every LCD are the same, and the movement of the liquid crystal molecules in the LCD is determined by an applied electric field and the permittivities of the liquid crystal molecules. In manufacturing the LCD, a minute difference between the free energy densities occurs. However, a difference of the free energy densities according to the characteristics of the liquid crystal molecules between the manufactured LCDs may be ignored. A coupling free energy density according to the electric field and the permittivity of the liquid crystal molecule for determining the movement of the liquid crystal molecule is expressed by Equation 2.

$$f_E = -\int_0^E D \cdot dE \quad \text{[Equation 2]}$$
$$= -\frac{1}{2}E_i\left(\varepsilon_\perp \delta_{ij} + \Delta\varepsilon_{//} n_i n_j + \frac{1}{2}\Delta\varepsilon_\perp (l_i l_j - m_i m_j)\right)E_j$$
$$= -\frac{1}{2}\left(\varepsilon_\perp E^2 + \Delta\varepsilon_{//}(n \cdot E)^2 + \frac{1}{2}\Delta\varepsilon_\perp((l \cdot E)^2 - (m \cdot E)^2)\right)$$

Where $\varepsilon_\perp = \frac{\varepsilon_l + \varepsilon_m}{2}$, $\Delta\varepsilon_{//} = \varepsilon_n - \frac{\varepsilon_l + \varepsilon_m}{2}$, $\Delta\varepsilon_\perp = \varepsilon_l - \varepsilon_m$.

In Equation 2, when it is assumed that the l-axis, m-axis, n-axis directions of the biaxial liquid crystal molecule correspond to an x-axis, a y-axis, and a z-axis, respectively, and the biaxial liquid crystal molecule is rotated by the angels of the Euler rotation of FIG. 4 to have angles $\phi$, $\theta$, and $\psi$, if the electric field is applied to the liquid crystal molecule in the z-axis direction, the coupling free energy density is expressed by Equation 3.

$$f_E = -\frac{1}{2}E^2(\varepsilon_n \cos^2\theta + (\varepsilon_m \cos^2\psi + \varepsilon_l \sin^2\psi)\sin^2\theta) \quad \text{[Equation 3]}$$

Where $(\varepsilon_n \cos^2\theta + (\varepsilon_m \cos^2\psi + \varepsilon_l \sin^2\psi)\sin^2\theta)$ abbreviates to an effective permittivity ($\epsilon_{eff}$), and thereby Equation 3 is rewritten as Equation 4.

$$f_E = -\frac{1}{2}\varepsilon_{eff} E^2 \quad \text{[Equation 4]}$$

In Equation 4, since when a direction having the largest permittivity of the permittivities of the l-axis, m-axis, and n-axis directions is arranged in parallel to the electric field, the free energy density is the smallest, and in this state, the liquid crystal molecule is in a stable state. Therefore, the liquid crystal molecule is aligned in the stable state having the smallest free energy density.

It is understood that the n-axis direction is only dependent on the bias angle $\theta$, but the m-axis and l-axis directions are dependent on the angle $\psi$ as well as the angle $\theta$. In addition, since the effective permittivity ($\epsilon_{eff}$) is varied based on the angles $\theta$ and $\psi$, the effective permittivities ($\epsilon_{eff}$) with respect to the respective angles $\theta$ and $\psi$ are calculated to show as in FIG. 6, FIG. 18, and FIG. 20.

Figure 6:
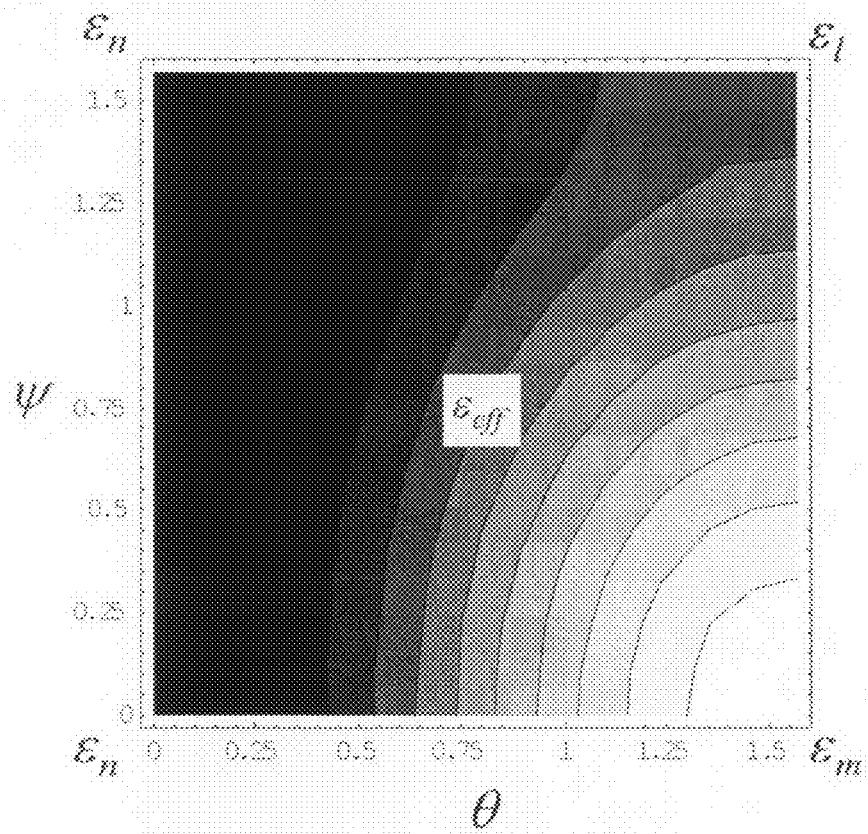
FIG. 6 is an equivalent permittivity diagram showing effective permittivity when a magnitude of permittivity decreases in order of m-axis, l-axis, and n-axis.
Figure 18:
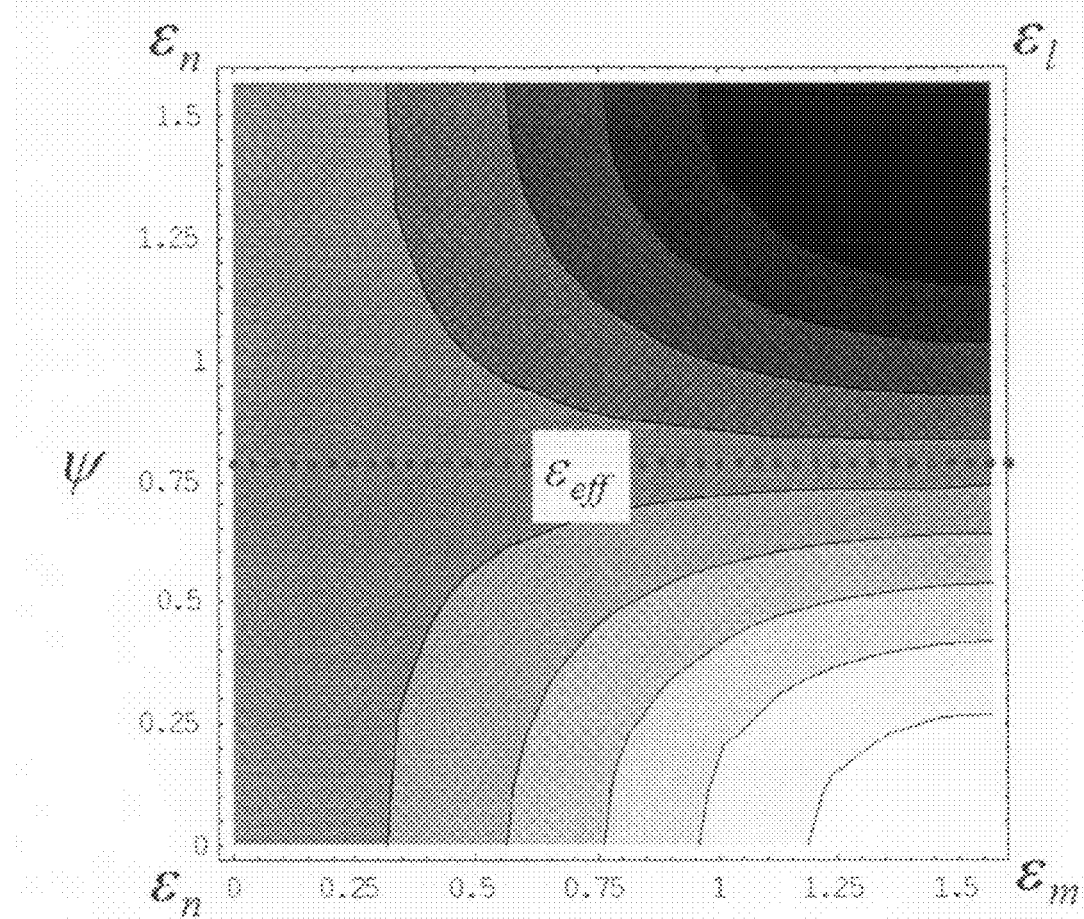
FIG. 18 is an equivalent permittivity diagram showing effective permittivity when a magnitude of permittivity decreases in order of m-axis, n-axis, and l-axis.
Figure 20:
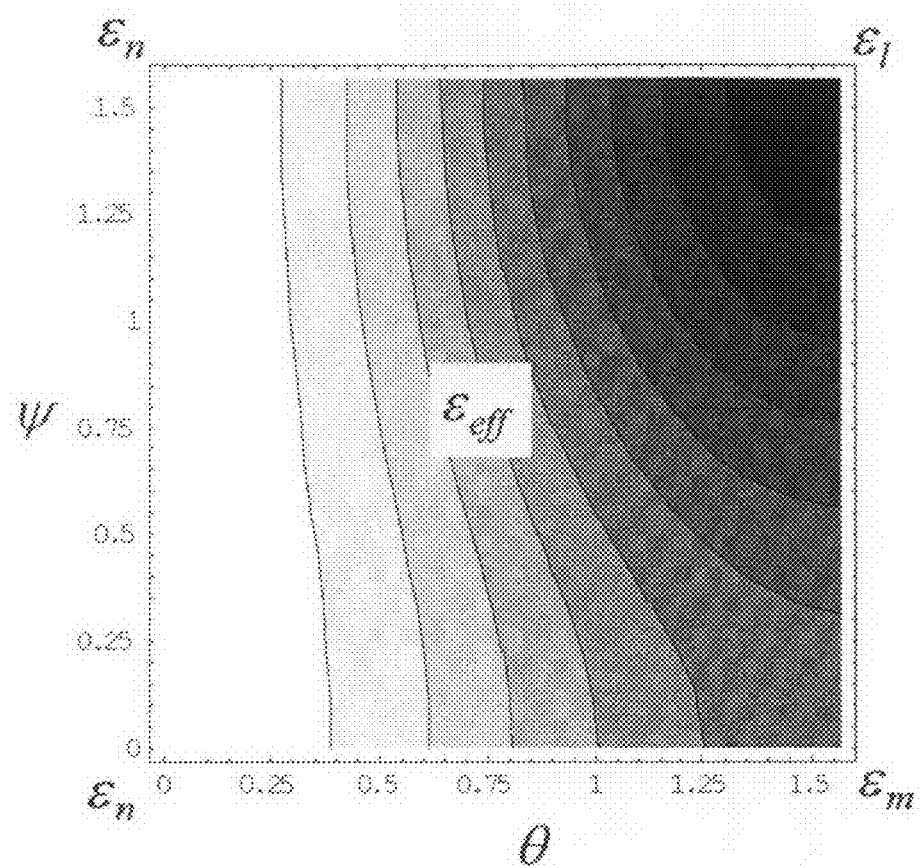
FIG. 20 is an equivalent permittivity diagram showing effective permittivity when a magnitude of permittivity decreases in order of n-axis, m-axis, and l-axis.

Comparing FIG. 6, FIG. 18, and FIG. 20, it will be appreciated that the magnitude order of the effective permittivities with respect to each axis direction are different from each other.

That is, in FIG. 6, the magnitude order of the permittivities is the m-axis direction>the l-axis direction>the n-axis direction; in FIG. 18, the magnitude order of the permittivities is the m-axis direction>the n-axis direction>the l-axis direction; and in FIG. 20, the magnitude order of the permittivities is the n-axis direction>the m-axis direction>the l-axis direction.

Here, it is assumed that the m-axis direction has a larger permittivity than the permittivity of the l-axis direction, and in FIG. 6, FIG. 18, and FIG. 20, this means that the permittivity of a bright region is larger than the permittivity of a dark region.

In FIG. 6, FIG. 18, and FIG. 20, the horizontal axis is the angle θ and the vertical axis is the angle ψ. The angle θ increases from 0 degrees to π/2 (≈1.5) degrees. Meanwhile, the angle ψ increases from 0 degrees to π/2 (≈1.5) degrees. Characters $\epsilon_n$, $\epsilon_l$ and $\epsilon_m$ shown in FIG. 6, FIG. 18, and FIG. 20 are effective permittivities ($\epsilon_{eff}$) corresponding to each of angles θ and ψ. That is, when the angle θ=0 and the angle ψ=0 or the angle θ=0 and the angle ψ=π/2, the effective permittivity is permittivity of the n-axis ($\epsilon_n$); when the angle θ=π/2 and the angle ψ=0, the effective permittivity is permittivity of the m-axis ($\epsilon_m$); and when the angle θ=π/2 and the angle ψ=π/2, the effective permittivity is permittivity of the l-axis ($\epsilon_l$).

In FIG. 6, FIG. 18, and FIG. 20, the solid lines (hereinafter referred to as "equivalent permittivity lines") are obtained by connecting positions having the same effective permittivity ($\epsilon_{eff}$), and the biaxial liquid crystal molecule varies the angles θ and ψ in a vertical direction with respect to the equivalent permittivity lines. As a result, the biaxial liquid crystal molecule varies the angles θ and ψ to have the largest effective permittivity ($\epsilon_{eff}$).

Since the equivalent permittivity lines are shown in FIG. 6, FIG. 18, and FIG. 20, respectively, FIG. 6, FIG. 18, and FIG. 20 are referred to as equivalent permittivity diagrams.

Next, alignment variations of the biaxial liquid crystal molecule according to examples of the exemplary embodiment will be described.

First, referring to FIG. 5, a relationship between shapes of the liquid crystal molecule and the l-axis, the m-axis, and the n-axis will be described.

Figure 5:
FIG. 5 shows three shapes of the biaxial liquid crystal molecule in a planar view of the biaxial liquid crystal molecule shown in FIG. 2.

FIG. 5 shows three shapes of the biaxial liquid crystal molecule in a planar view of the biaxial liquid crystal molecule shown in FIG. 2. FIG. 5 is obtained by redrawing corners of the rectangular shape into a rounded shape when planarly viewing the cuboid.

In FIG. 5, the first diagram shows the shape of the biaxial liquid crystal molecule when the l-axis direction goes into a ground surface. The second diagram shows the shape of the biaxial liquid crystal molecule when the m-axis direction come out the ground surface, and the third diagram shows the shape of the biaxial liquid crystal molecule when the n-axis direction goes into the ground surface.

The planar shapes of the liquid crystal molecule of FIG. 5 are referred to as planar liquid crystal molecule shapes.

Next, based on the three planar liquid crystal molecule shapes shown in FIG. 5, alignment variations of the biaxial liquid crystal molecule will be described.

As shown in FIG. 6, the magnitude order of the permittivity of the m-axis direction>the l-axis direction>the n-axis direction, and alignment variations of the liquid crystal molecule will be described with reference to FIG. 7.

Figure 7:
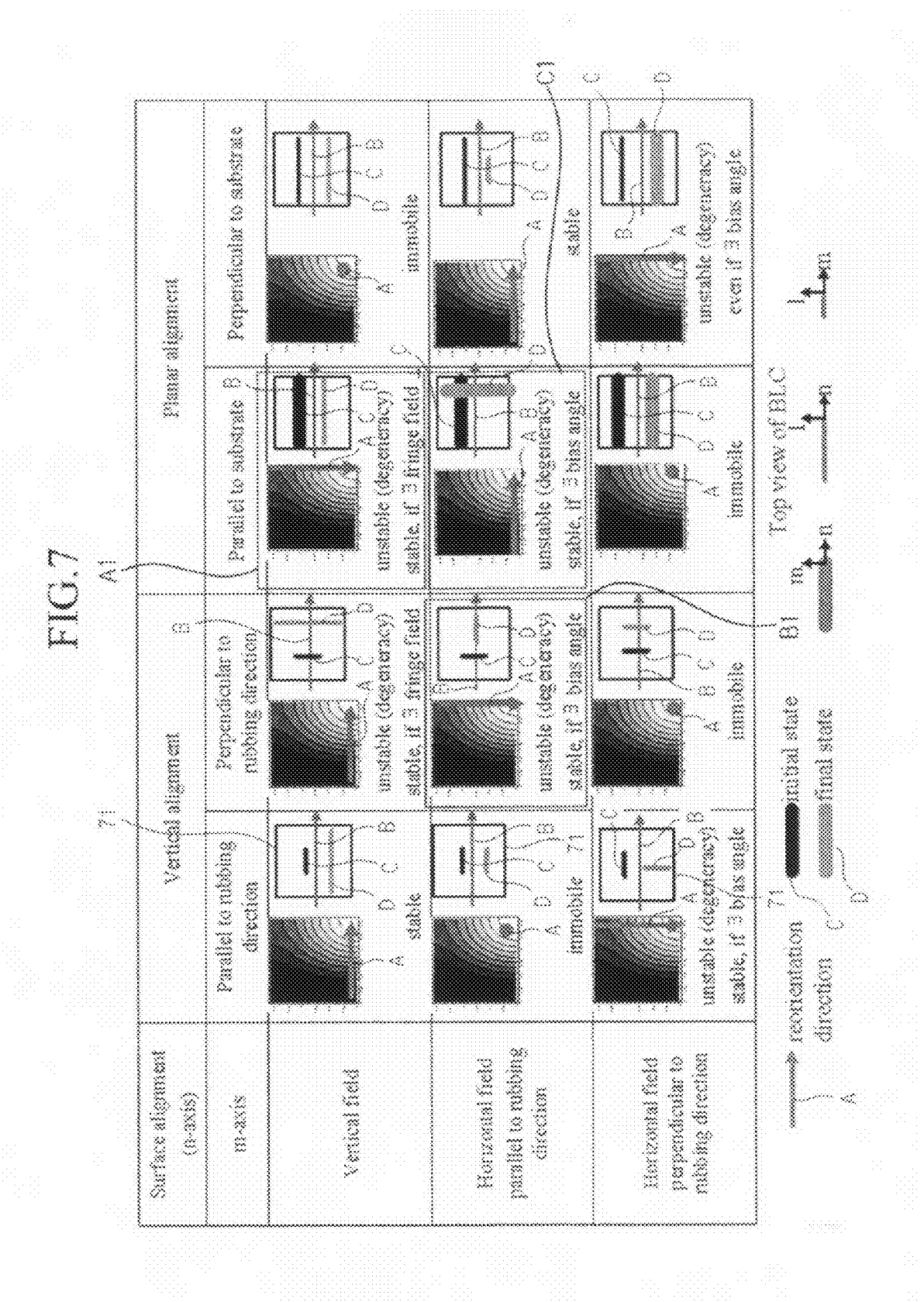

FIG. 7 shows rotation variations of the liquid crystal molecule having a permittivity relationship with respect to each axis direction as shown in FIG. 6.

The relationship of the effective permittivity ($\epsilon_{eff}$) and the angles θ and ψ of the biaxial liquid crystal molecule in accordance with the permittivity magnitude is shown in FIG. 6. In FIG. 6, for observing the states of the biaxial liquid crystal molecule before and after the electric field application, the below conditions are defined. That is, for setting an initial state of the biaxial liquid crystal molecule, the n-axis and m-axis directions of the liquid crystal molecule should be defined, and for setting a final state of the biaxial liquid crystal molecule after the electric field application, a direction of the applied electric field should be determined.

The conditions are described below in detail.

First, an alignment type of n-axis direction of the biaxial liquid crystal molecule is defined based on a type of the used alignment layer in the LCD. That is, when the alignment layer is a vertical alignment layer, the n-axis direction of the biaxial liquid crystal molecule has a vertical alignment, but when the alignment layer is a planar alignment layer, the n-axis direction of the biaxial liquid crystal molecule has a planar alignment.

In the meantime, since the m-axis direction of the biaxial liquid crystal molecule is varied based on the n-axis direction, the m-axis direction is classified in accordance with the alignment type of the n-axis direction. When the n-axis direction of a molecule 310 has a vertical alignment with respect to the surface of panels 100 and 200 on which alignment layers 11 and 21 are provided, the m-axis direction is aligned in a direction parallel to or perpendicular to a rubbing direction of alignment layers 11 and 21. However, when the n-axis direction has the planar alignment, that is parallel to the major surfaces of alignment layers 11 and 21, the m-axis direction is aligned in a direction parallel or perpendicular to the substrate 110 or 210.

A direction of the electric field is classified into a case for generating an electric field in a vertical direction and a case for generating an electric field in a horizontal direction. In generating the electric field in the horizontal direction, the electric field of the horizontal direction is classified into whether the electric field is parallel or whether it is perpendicular to the rubbing direction.

FIG. 7 shows examples of the alignment variations of the biaxial liquid crystal molecule 310 before and after the electric field application based on the above classification.

In FIG. 7, the equivalent permittivity diagrams of the effective permittivity ($\epsilon_{eff}$) of each example include arrows A. The arrows A indicate an alignment angle variation of the liquid crystal molecule from the initial state to the final state. Dots in FIG. 7 mean that the alignment of the liquid crystal molecule is the same in the initial state and the final state without the alignment angle variation.

Rectangular boxes indicated by replacement character 71 positioned next to the equivalent permittivity diagrams include one arrow B and two planar liquid crystal molecule shapes C and D. The rectangular boxes 71 indicate the substrate 110 or 210, and the arrow B indicates a rubbing direction. Meanwhile, the planar liquid crystal molecule shape B indicates the initial state, and the planar liquid crystal molecule shape C indicates the final state.

The planar liquid crystal molecule state B in the initial state is obtained by defining the n-axis and m-axis directions based on the type of alignment layer and the rubbing direction, and the planar liquid crystal molecule state C in the final state is obtained by aligning the liquid crystal molecule in a direction having the largest magnitude of permittivity of three axis directions. Three alignment examples of the liquid crystal molecule in the initial state and the final state will described with reference to FIG. 8 to FIG. 17.

Each example is classified into a stable state, an unstable state, and an immobile state of the liquid crystal molecule. When biaxial liquid crystal material is in a stable state, all the biaxial liquid crystal molecules 310 are rotated in a constant direction, and thereby the biaxial liquid crystal molecules are used in the LCD without treatment. That is, in the stable state, when the electric field is applied to the liquid crystal molecules, the liquid crystal molecules are naturally rotated without errors such as a texture problem. However, even when the liquid crystal molecules are in the stable state, a bias angle may exist with respect to the rubbing direction. The stable state without the bias angle is the same as the unstable state. The rotation direction of the liquid crystal molecule may be limited by the bias angle.

Alternatively, in the unstable state, the biaxial liquid crystal molecules have two or more rotation directions, and thereby the biaxial liquid crystal molecules may rotate in difficult directions. When an LCD uses the liquid crystal molecules having the unstable state, the alignment directions of the liquid crystal molecules in the liquid crystal layer may be not regular, and therefore it is difficult to use the liquid crystal molecules having the unstable state in the LCD. For solving the above problem, the rotation direction of the liquid crystal molecule is limited to one direction by forming a bias angle in a predetermined direction or by using a fringe field, in the initial state. That is, in the unstable state, after defining the rotation direction of the biaxial liquid crystal molecule by forming the bias angle or by using the fringe field, in the initial state, the liquid crystal molecules having the unstable state may be used for manufacturing the LCD. As described above, when one rotation direction of the two or more rotation directions is defined, the liquid crystal molecules having the unstable state may be used to display images without the texture problem.

When the liquid crystal molecule has the immobile state, the liquid crystal molecule is not rotated. Therefore, the liquid crystal molecules having the immobile state are not used for manufacturing an LCD. However, when a separate structure is added to the liquid crystal molecule to vary the direction of the liquid crystal molecule in the initial state, and then the electric field is applied, the liquid crystal molecules may be rotated and therefore the liquid crystal molecules having the immobile state may be used for manufacturing the LCD.

In considering only the initial state and the final state of the biaxial liquid crystal of the plurality of examples, the three conditions described below should be satisfied in order to manufacture a good LCD. The reason for selecting the three conditions is that it becomes easy to control the liquid crystal since the rotation angle of the liquid crystal molecule is about 90 degrees.

The first condition is to use a vertical alignment layer that has an m-axis that is perpendicular to a rubbing direction, which is to apply a horizontal electric field parallel to the rubbing direction. The second condition is to use a vertical alignment layer that has an m-axis parallel to the rubbing direction, which is to apply a horizontal electric field perpendicular to the rubbing direction. The third condition is to use a planar alignment layer that has an m-axis parallel to a substrate, which is to apply the horizontal electric field parallel to the rubbing direction.

Alternatively, except for the three conditions, the LCD may include a retardation plate. In particular, except for the examples of which the liquid crystal molecule has the immobile state, the below examples that satisfy the below conditions may include the retardation plate. At this time, the retardation plate may be a π/4 plate and change linearly polarized light to circularly polarized light to display images.

In the first example, a vertical alignment layer is used, the m-axis is parallel to a rubbing direction, and a vertical electric field is applied, and in the second example, the vertical alignment layer is used, the m-axis is perpendicular to the rubbing direction, and the vertical electric field is applied. In the third example, a parallel alignment layer is used, the m-axis is parallel to a substrate, and the vertical electric field is applied, and in the fourth example, the parallel alignment layer is used, the m-axis is perpendicular to the substrate, and the horizontal electric field that is parallel to the rubbing direction is applied. In addition, in the fifth example, the horizontal alignment layer is used, the m-axis is perpendicular to a substrate, and the horizontal electric field that is perpendicular to the rubbing direction is applied.

Examples A1, B1, and C1 in FIG. 7 are described below in detail.

Figure 8:
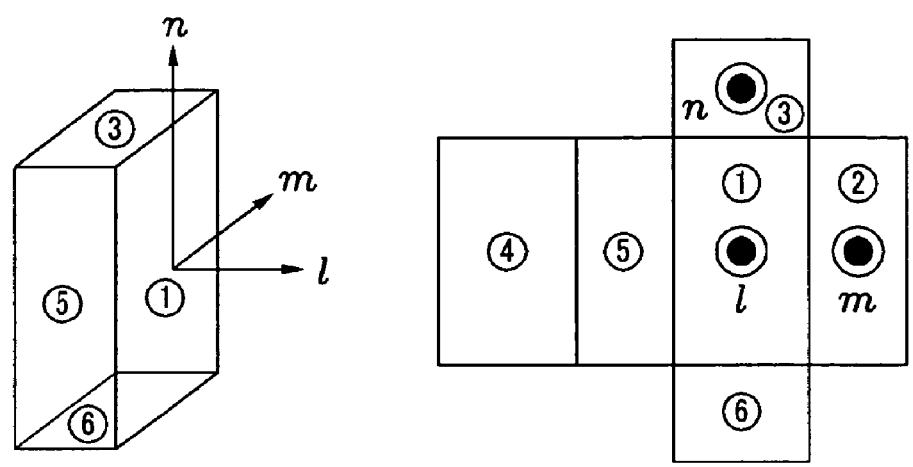
FIG. 8 shows a liquid crystal molecule as a cuboid shape and shows each plane of the cuboid shape according to an exemplary embodiment of the present invention.

Before the explanation of the examples A1, B1, and C1 in FIG. 7, a liquid crystal molecule is defined as shown in FIG. 8. FIG. 8 shows a liquid crystal molecule as a cuboid, and shows each plane of the cuboid according to an exemplary embodiment of the present invention.

As shown in FIG. 8, the liquid crystal molecule is illustrated as a cuboid. In the cuboid, a side of an l-axis direction is referred to as a first side ①, a side of an m-axis direction is referred to as a second side ②, a side of an n-axis direction is referred to as a third side ③, a side facing the first side ① is referred to as a fourth side ④, a side facing the second side ② is referred to as a fifth side ⑤, and a side facing the third side ③ is referred to as a sixth side ⑥.

The description of a rotation of the liquid crystal molecule with respect to the examples A1, B1, and C1 is provided below.

Angles $\phi$, $\theta$, and $\psi$ used below are generated based on the Euler rotation Shown in FIG. 4.

First, the example A1 will be described with reference to FIG. 9 to FIG. 11.

Figure 9:
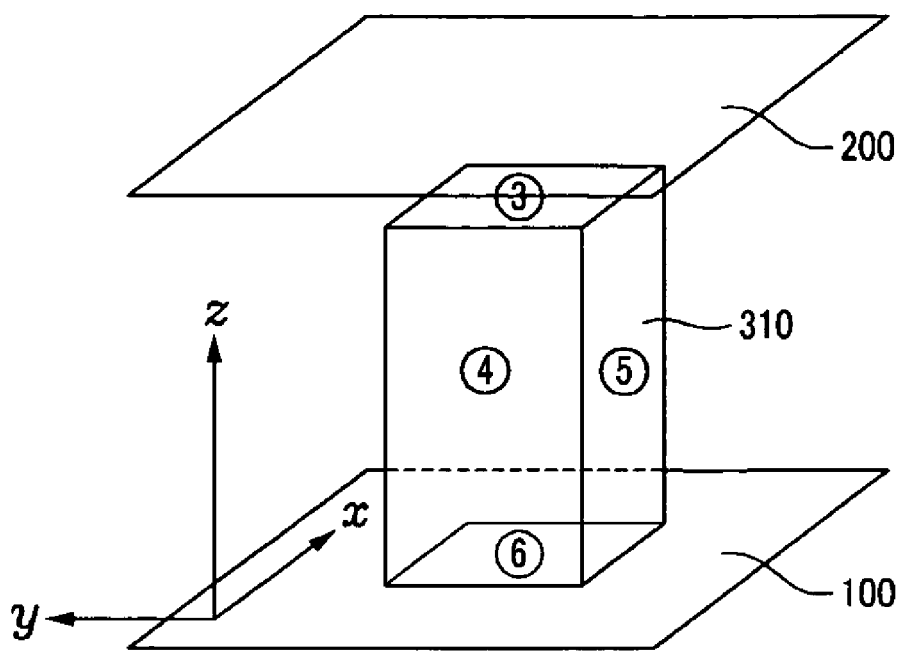
FIG. 9 to FIG. 11 are diagrams for explaining the alignment variations of a liquid crystal molecule according to an example A1 in FIG. 7.
Figure 10:
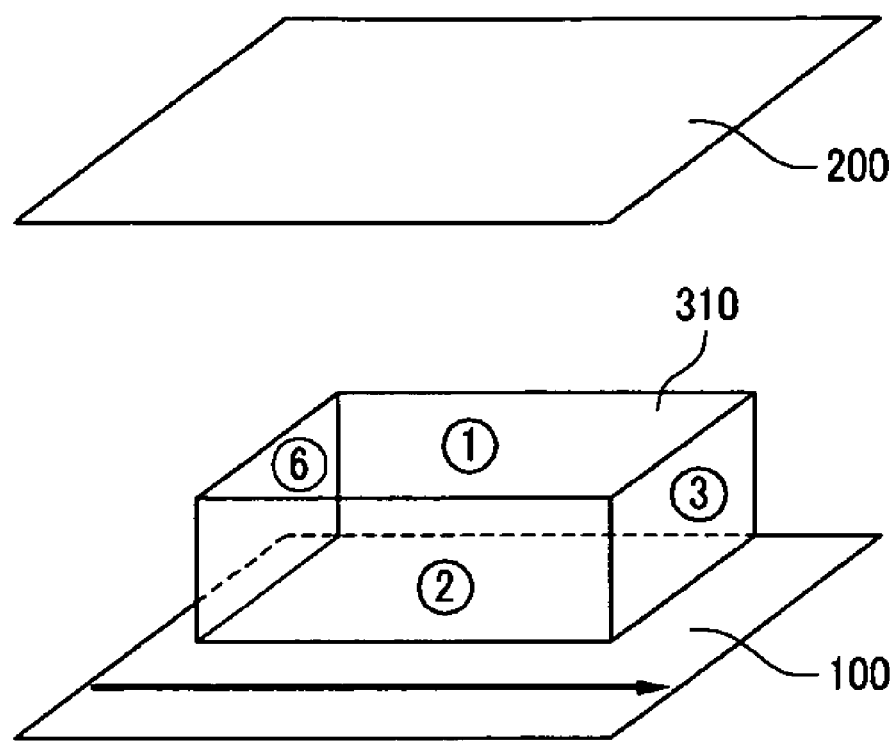
Figure 11:
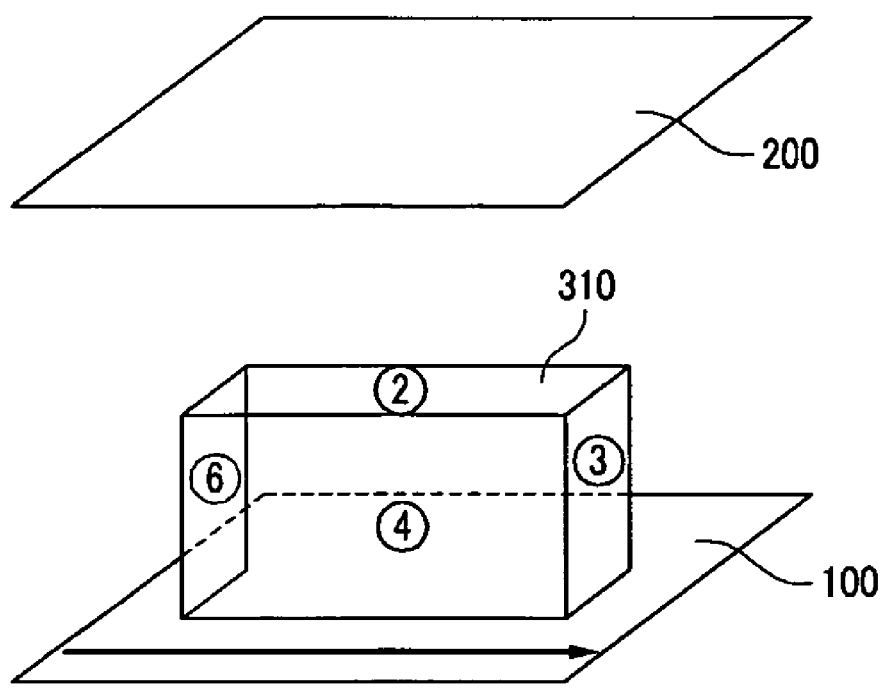

FIG. 9 to FIG. 11 are diagrams for explaining alignment variations of a liquid crystal molecule according to the example A1 in FIG. 7. FIG. 9 shows position relationships of the x-axis, y-axis, and z-axis and each side of the liquid crystal molecule 310 of the cuboidal shape. Values of angles $\phi$, $\theta$, and $\psi$ of the liquid crystal molecule 310 in an initial state and a final state are defined on the basis of values (0, 0, 0) of angles $\phi$, $\theta$, and $\psi$ shown in FIG. 9. Accordingly, the state in FIG. 9 is referred to as a reference state.

FIG. 10 shows an alignment state of the liquid crystal molecule 310 in the initial state. The example A1 uses a horizontal alignment layer, and thereby the n-axis direction of the liquid crystal molecule 310 is aligned along the rubbing direction. In addition, in the case of the example A1, the m-axis direction is parallel to a substrate, and thereby the m-axis direction is parallel to the substrate (and is perpendicular to the rubbing direction).

Meanwhile, FIG. 11 shows an alignment state of the liquid crystal molecule 310 in the final state. Since the example A1 is supplied with a vertical electric field, and the m-axis direction of the l-axis, m-axis, and n-axis directions has the largest permittivity, the m-axis direction of the liquid crystal molecule 310 is aligned as an electric field direction. Therefore, the second side ② is aligned to be an upper side.

In the initial state, the m-axis is perpendicular to the rubbing direction, and is aligned in a direction parallel to a substrate. At this time, the liquid crystal molecule 310 satisfying the m-axis alignment has two rotation directions. The liquid crystal molecule 310 may be rotated in both of the two rotation directions to align, and when an electric field is applied, there are two rotation directions such that the second side ② of the liquid crystal molecule 310 is positioned as the upper side. Thereby, the rotation direction of the liquid crystal molecule 310 is not defined to one of two directions, and therefore the state of the liquid crystal molecule 310 is the unstable state. For changing the unstable state to the stable state, the rotation direction of the liquid crystal molecule 310 is limited to one direction by forming a fringe field between the pixel electrodes and the common electrode.

Angles are described in lower portions of FIG. 9 to FIG. 11. A position variation of a position in the equivalent permittivity diagram of FIG. 6 defined by the angles shown in FIG. 10 and a position in the equivalent permittivity diagram of FIG. 6 defined by the angles shown in FIG. 11 is the same as the arrow A of the equivalent permittivity diagram of FIG. 7. The angles $\phi$, $\theta$, and $\psi$ used below are generated by applying the Euler rotation with respect to FIG. 9.

In the example A1, since the liquid crystal molecule 310 in the initial state and the final state does not rotate at about 90 degrees, a $\pi/4$ plate may be used as a retardation plate.

Next, the description of the example B1 in FIG. 7 will be described with reference to FIG. 12 to FIG. 14.

Figure 12:
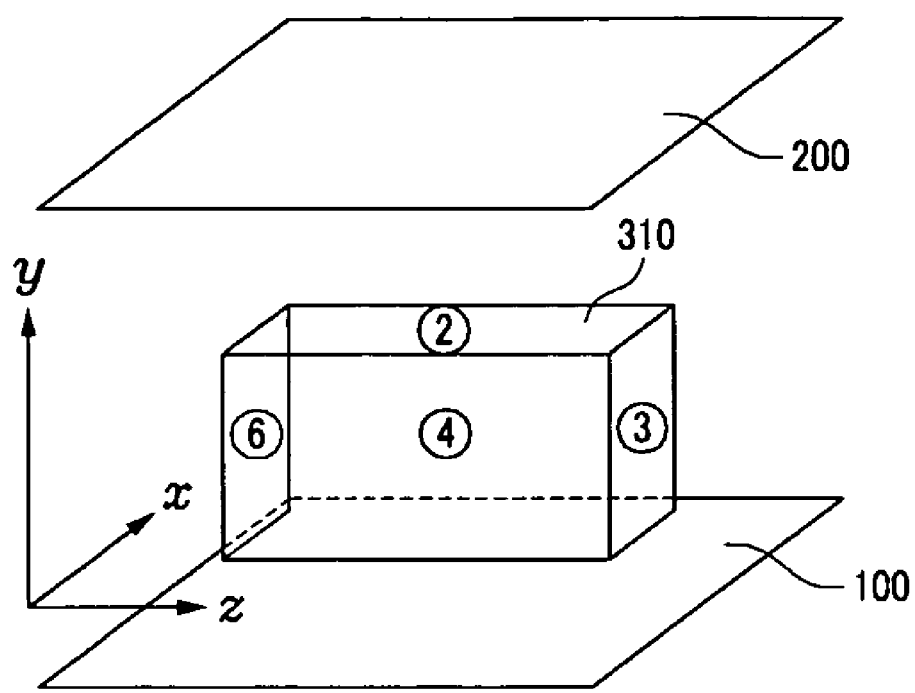
FIG. 12 to FIG. 14 are diagrams for explaining the alignment variations of a liquid crystal molecule according to an example B1 in FIG. 7.
Figure 13:
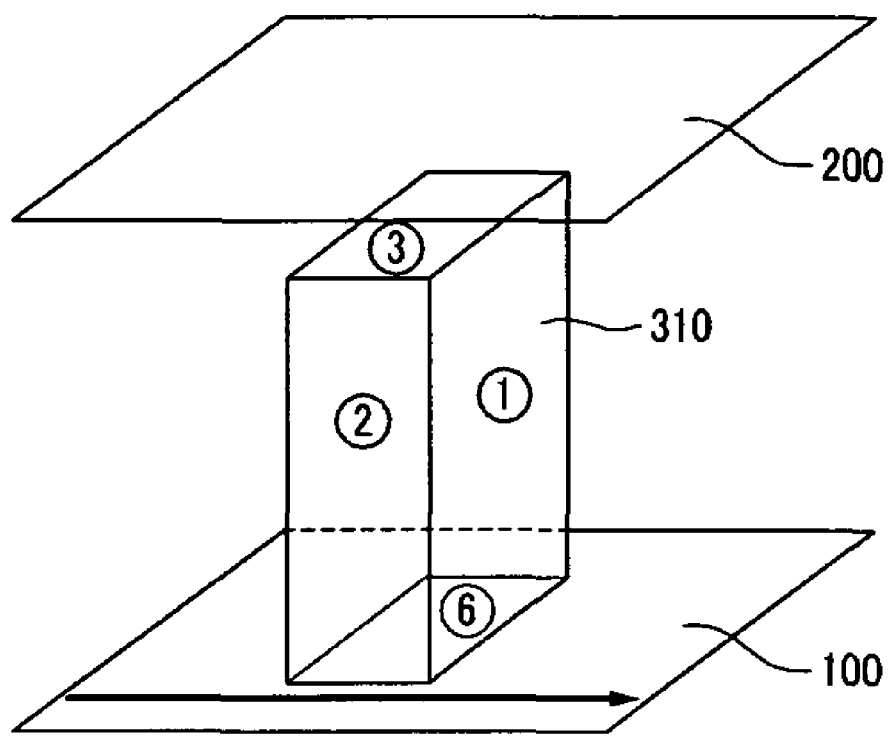
Figure 14:
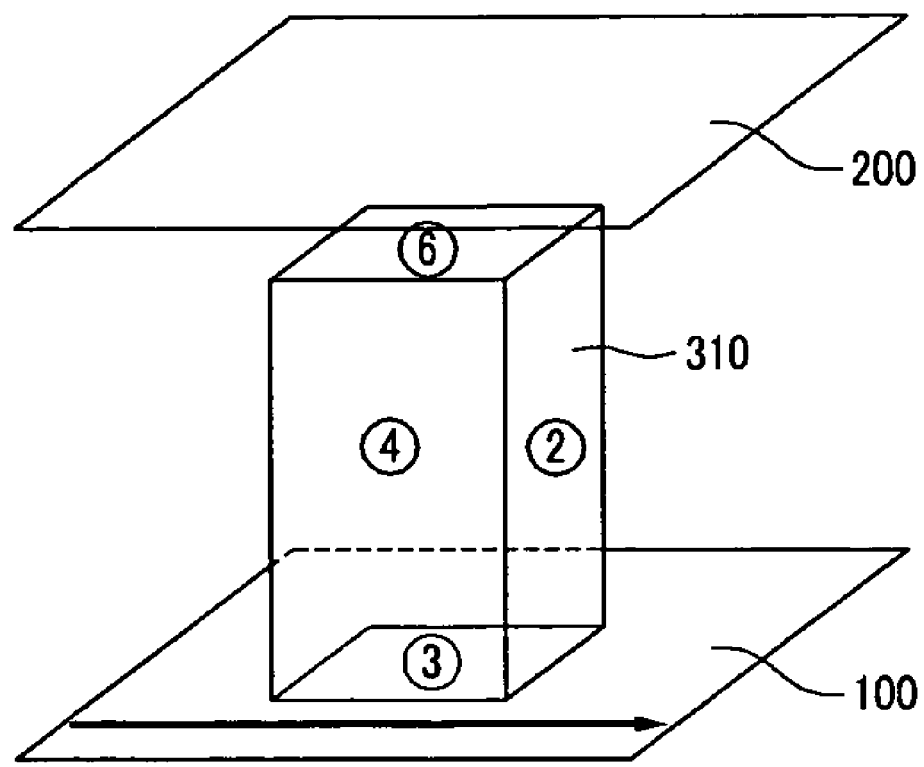

FIG. 12 to FIG. 14 are diagrams for explaining alignment variations of a liquid crystal molecule according to an example B1 in FIG. 7.

FIG. 12 shows position relationships of the x-axis, y-axis, and z-axis and each side of the liquid crystal molecule 310 of the cuboidal shape, FIG. 13 shows alignment of the liquid crystal molecule 310 in the initial state, and FIG. 14 shows alignment of the liquid crystal molecule 310 in the final state.

The example B1 uses a vertical alignment layer, and therefore the n-axis direction of the liquid crystal molecule 310 has a direction perpendicular to a substrate, and the m-axis direction of the liquid crystal molecule 310 has a direction perpendicular to a rubbing direction. Accordingly, the example B1 has an initial state as shown in FIG. 13.

When an electric field is applied to the liquid crystal molecule 310, the electric field applied to the liquid crystal molecule 310 is a horizontal electric field. Therefore, since the m-axis direction of the l-axis, m-axis, and n-axis directions has the largest permittivity, the liquid crystal molecule 310 is rotated such that the m-axis direction of the liquid crystal molecule 310 becomes an electric field direction. Therefore, as shown in FIG. 14, the second side ② is aligned in the same direction as the rubbing direction in the final state.

In this example B1, the direction number of the m-axis that is perpendicular to the rubbing direction is two, and therefore the liquid crystal molecule 310 rotates in both of the two directions to reach the final state. That is, the liquid crystal molecule 310 reaches the final state though two rotation directions. For limiting the rotation direction of the liquid crystal molecule 310 to one, the liquid crystal molecule 310 is aligned to make a bias angle with respect to an electrode field direction in the initial state. Thereby, a rotation direction of the liquid crystal molecule 310 is defined in one direction to remove an unstable state of the liquid crystal molecule 310 in the initial state.

Next, the example C1 in FIG. 7 will be described with reference to FIG. 15 to FIG. 17.

Figure 15:
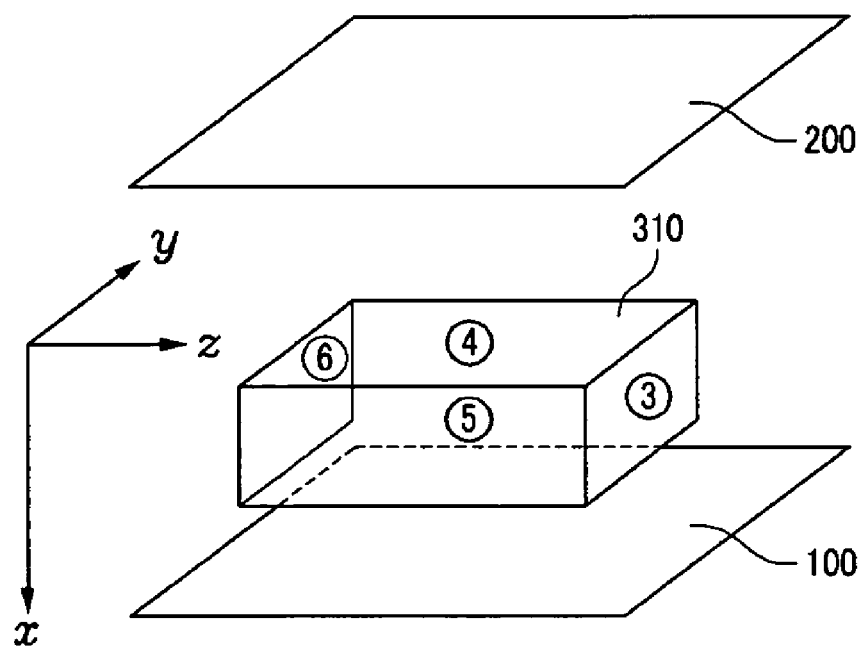
FIG. 15 to FIG. 17 are diagrams for explaining the alignment variations of a liquid crystal molecule according to an example C1 in FIG. 7.
Figure 16:
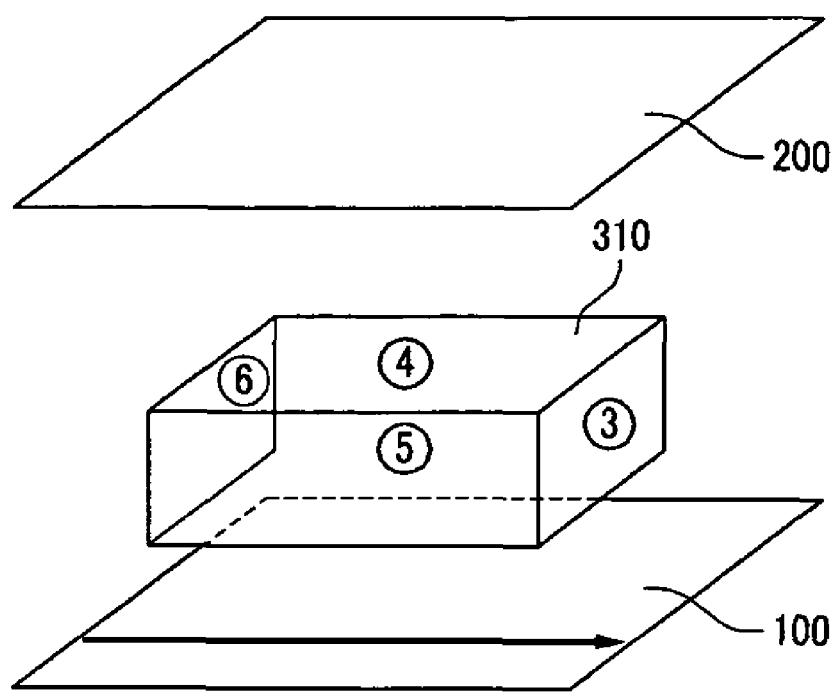
Figure 17:
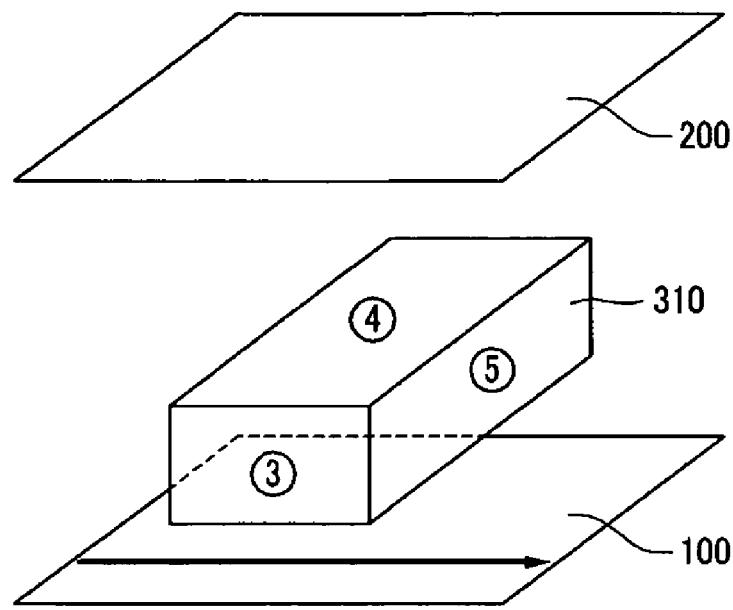

FIG. 15 to FIG. 17 are diagrams for explaining alignment variations of a liquid crystal molecule according to an example C1 in FIG. 7.

FIG. 15 shows position relationships of the x-axis, y-axis, and z-axis and each side of the liquid crystal molecule 310 of the cuboidal shape, FIG. 16 shows an alignment of the liquid crystal molecule 310 in the initial state, and FIG. 17 shows an alignment of the liquid crystal molecule 310 in the final state.

The example C1 uses a planar alignment layer, and therefore the n-axis direction of the liquid crystal molecule 310 has a direction parallel to a substrate, and the m-axis direction of the liquid crystal molecule 310 has a direction parallel to the substrate. Accordingly, the example C1 has an initial state as shown in FIG. 15. When an electric field is applied to the liquid crystal molecule 310, the electric field applied to the liquid crystal molecule 310 is a horizontal electric field. Therefore, the m-axis direction of the liquid crystal molecule 310 is aligned along the rubbing direction. Therefore, as shown in FIG. 16, the second side ② is aligned in the same direction as the rubbing direction in the final state.

In this example C1, the direction number of the m-axis perpendicular to the rubbing direction is two, and therefore the liquid crystal molecule 310 rotates in both of the two directions to reach the final state. That is, the liquid crystal molecule 310 reaches the final state through two rotation directions. For limiting the rotation direction of the liquid crystal molecule 310 to one, the liquid crystal molecule 310 is aligned to make a bias angle with respect to an electrode field direction in the initial state. Thereby, a rotation direction of the liquid crystal molecule 310 is defined in one direction to remove an unstable state of the liquid crystal molecule 310 in the initial state.

In the above, the examples having the magnitude order of the permittivity is the m-axis direction>the l-axis direction>the n-axis direction have been described.

Next, the examples having the magnitude order of the permittivity is the m-axis direction>the n-axis direction>the l-axis direction will be described with reference to FIG. 18 and FIG. 19.

Figure 19:
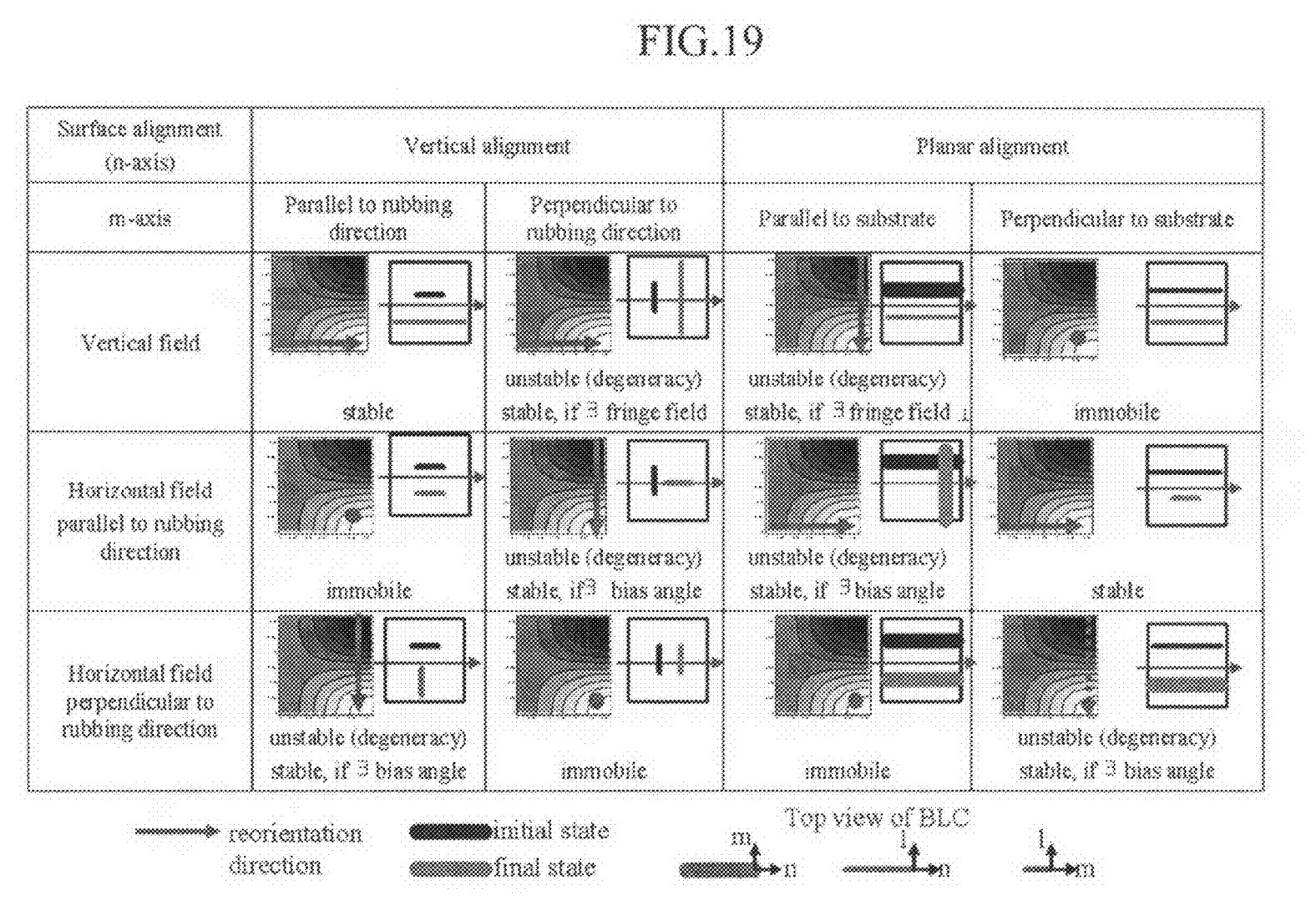

FIG. 18 is an equivalent permittivity diagram showing effective permittivity when a value of permittivity decreases in the order of the m-axis, the n-axis, and the l-axis, and FIG. 19 shows alignment variations of the liquid crystal molecule having a permittivity relationship with respect to each axis direction as shown in FIG. 18.

The effective permittivity diagram in FIG. 18 is symmetrical to a dotted line that has a $\psi$ value of $\pi/4$ (about 0.75 in FIG. 18). In this example, a portion having the $\psi$ value of about 0 and a $\theta$ value of about $\pi/2$ is the brightest, and thereby the portion has the largest effective permittivity value.

FIG. 19 shows initial states and final states of the liquid crystal molecule under 30 the same conditions as the examples of FIG. 7.

That is, an alignment type of the n-axis direction of the biaxial liquid crystal molecule is defined based on the type of alignment layer used in the LCD. That is, when the alignment layer is a vertical alignment layer, the n-axis direction of the biaxial liquid crystal molecule has a vertical alignment, but when the alignment layer is a planar alignment layer, the n-axis direction of the biaxial liquid crystal molecule has a planar alignment. In the meantime, since the m-axis direction of the biaxial liquid crystal molecule is varied based on the n-axis direction, the m-axis direction is classified in accordance with the vertical alignment or the planar alignment as below. When the n-axis direction has the vertical alignment, the m-axis direction is aligned in a direction parallel or perpendicular to a rubbing direction. However, when the n-axis direction has the planar alignment, the m-axis direction is aligned in a direction parallel or perpendicular to the substrate 110 or 210.

A direction of the electric field is classified into a case for generating an electric field in a vertical direction and a case for generating an electric field in a horizontal direction. In generating the electric field in the horizontal direction, the electric field of the horizontal direction is classified into whether the electric field is parallel or whether it is perpendicular to the rubbing direction.

FIG. 19 shows examples of the alignment variations of the biaxial liquid crystal molecule in the initial state and the final state, before and after the electric field application, based on the above classification.

In FIG. 19, each example is classified into a stable state, an unstable state, and an immobile state of the liquid crystal molecule.

When the biaxial liquid crystal has the stable state, all the biaxial liquid crystal molecules are rotated in a constant direction, and thereby the biaxial liquid crystal molecules are used in the LCD without treatment. However, even when the liquid crystal molecule is in the stable state, each liquid crystal molecule may have a bias angle, and thereby the rotation direction of the liquid crystal molecule may be defined by the bias angle.

Alternatively, in the unstable state, the biaxial liquid crystal molecule has two or more rotation directions, and thereby the biaxial liquid crystal molecules may rotate in difficult directions. When an LCD uses the liquid crystal molecules having the unstable state, the alignment directions of the liquid crystal molecules in the liquid crystal layer may be not regular, and therefore it is difficult to use the liquid crystal molecules having the unstable state in the LCD. For solving above problem, the rotation direction of the liquid crystal molecule is limited to one direction by forming a bias angle in a predetermined direction or by using a fringe field, in the initial state. That is, when the liquid crystal molecule has the unstable state, the liquid crystal molecules may be used for manufacturing the LCD by giving the bias angle to the liquid crystal molecules or forming the fringe field, in the initial state.

When the liquid crystal molecule has the immobile state, the liquid crystal molecule is not rotated. Therefore, the liquid crystal molecules having the immobile state are not used for manufacturing an LCD. However, when a separate structure is added to the liquid crystal molecule to vary the direction of the liquid crystal molecule in the initial state, and then the electric field is applied, the liquid crystal molecules may be rotated and thereby the liquid crystal molecules having an immobile state may be used for manufacturing the LCD.

In considering only the initial state and the final state of the biaxial liquid crystal of the plurality of examples, the three conditions described below should be satisfied in order to manufacture a good LCD.

The reason for selecting the three conditions is to make it easy to control the liquid crystal since a rotation angle of the liquid crystal molecule is about 90 degrees.

The first condition is to use a vertical alignment layer that has an m-axis perpendicular to a rubbing direction, which is to apply a horizontal electric field parallel to the rubbing direction. The second condition is to use the vertical alignment layer that has an m-axis parallel to the rubbing direction, which is to apply a horizontal electric field perpendicular to the rubbing direction. The third condition is to use a planar alignment layer that has an m-axis parallel to a substrate, which is to apply the horizontal electric field parallel to the rubbing direction.

Alternatively, except for the three conditions, the LCD may include a retardation plate. In particular, except for the examples of which the liquid crystal molecule has the immobile state, the below examples that satisfy the below conditions may include the retardation plate. At this time, the retardation plate may be a $\pi/4$ plate and change linearly polarized light to circularly polarized light to display images.

In the first example of the conditions, a vertical alignment layer is used, an m-axis is parallel to a rubbing direction, and a vertical electric field is applied, and in the second example, the vertical alignment layer is used, the m-axis is perpendicular to the rubbing direction, and the vertical electric field is applied. In the third example, a parallel alignment layer is used, the m-axis is parallel to a substrate, and the vertical electric field is applied, and in the fourth example, the parallel alignment layer is used, the m-axis is perpendicular to the substrate, and the horizontal electric field that is parallel to the rubbing direction is applied. In addition, in the fifth example, the horizontal alignment layer is used, the m-axis is perpendicular to a substrate, and the horizontal electric field that is perpendicular to the rubbing direction is applied.

Next, the examples having the magnitude order of the permittivity of the n-axis direction>the m-axis direction>the l-axis direction will be described with reference to FIG. 20.

FIG. 20 is an equivalent permittivity diagram showing effective permittivity when a value of permittivity decreases in order of the n-axis, m-axis, and l-axis.

In FIG. 20, the effective permittivity decrease as a $\theta$ value increases. As a result, the liquid crystal molecule is in the final state, and it is forecasted that the liquid crystal molecule rotates in a direction in which the $\theta$ value decreases. Meanwhile, even though the effective permittivity is little varied based on a variation of a $\psi$ value, as the $\theta$ values becomes closer to the $\pi/2$ value, the variation of the effective permittivity based on the $\psi$ value increases. When the $\theta$ value is large, as the $\psi$ values decreases, the value of the effective permittivity increases.

The examples having the magnitude order of the permittivity of the n-axis direction >the m-axis direction >the l-axis direction may classify initial states and final states of a liquid crystal molecule, as shown in FIG. 7 and FIG. 19.

As described above, the embodiment classifies an initial alignment state of a liquid crystal molecule, and then when an electric field is applied, the liquid crystal molecule rotates such that a direction having the largest permittivity rotates as an electric field direction. Thereby, the final state of the liquid crystal molecule is determined.

In the above, various examples based on the equivalent permittivity diagrams in FIG. 6 and 18 have been described. In the specification, specific examples based on the equivalent permittivity diagram in FIG. 20 are omitted, but the description regarding FIG. 7 and 19 may be adapted to FIG. 20 as is obvious skilled persons in the art.

It is assumed that the magnitudes of the permittivity with respect to the l-axis, m-axis, and n-axis directions are different, but the permittivity of two of the three directions may be the same. In this case, the above embodiment may also be adapted. At this time, the values of the permittivity of two directions that are the same may be less that a value of the permittivity of the remaining direction.

Accordingly, based on the characteristics, the alignment direction, and the electric field application direction of the biaxial liquid crystal molecule, various LCD can be manufactured. In addition, in using a uniaxial liquid crystal, a liquid crystal material used in an LCD is limited, but an LCD can be manufactured using various materials by using biaxial liquid crystal having the biaxial liquid crystal molecules. Therefore, the manufacturing cost of the LCD decreases. Moreover, since the various LCDs can be manufactured with the biaxial liquid crystal, display characteristics of the LCDs differ, and thereby a selection width of an LCD that is suitable to its surroundings becomes wide.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    an upper panel comprising an upper alignment layer;
    a lower panel comprising a lower alignment layer; and
    a liquid crystal layer interposed between the upper panel and the lower panel and comprising liquid crystal molecules,
    wherein each of the liquid crystal molecules has different refractive indexes and different permittivities with respect to three axis directions,
    the upper alignment layer and the lower alignment layer are vertical alignment layers and have a rubbing direction, respectively,
    before the application of an electric field, a first axis of each liquid crystal molecule is aligned in a vertical direction by the vertical alignment layer, and a second axis of each liquid crystal molecule is aligned in a direction parallel to the rubbing direction, and
    after the application of the electric field, one having the largest permittivity of the axis directions of each liquid crystal molecule is aligned in parallel to the applied electric field.

2. The liquid crystal display of claim 1, wherein the electric field is applied in a vertical direction.

3. The liquid crystal display of claim 1, wherein the upper panel and the lower panel further comprise a retardation plate and a polarizer, respectively.

4. The liquid crystal display of claim 1, wherein the electric field is applied in a horizontal direction and in a direction parallel to the rubbing direction.

5. The liquid crystal display of claim 1, wherein the electric field is applied in a horizontal direction and in a direction perpendicular to the rubbing direction.

6. The liquid crystal display of claim 5, wherein each liquid crystal molecule is tilted by a bias angle with respect to an application direction of the electric field before the application of the electric field.

7. The liquid crystal display of claim 1, wherein a fringe field is generated in at least one portion of the electric field.

8. A liquid crystal display comprising:
    an upper panel comprising an upper alignment layer;
    a lower panel comprising a lower alignment layer; and
    a liquid crystal layer interposed between the upper panel and the lower panel and comprising liquid crystal molecules,
    wherein each of the liquid crystal molecules has different refractive indexes and different permittivities with respect to three axis directions,
    the upper alignment layer and the lower alignment layer are horizontal alignment layers and have a rubbing direction, respectively,
    before the application of an electric field, a first axis of each liquid crystal molecule is aligned in a horizontal direction by the horizontal alignment layer and along the rubbing direction and a second axis of each liquid crystal molecule is aligned in a direction parallel to the upper panel or the lower panel, and
    after the application of the electric field, one having the largest permittivity of the axis directions of each liquid crystal molecule is aligned in parallel to the applied electric field.

9. The liquid crystal display of claim 8, wherein the electric field is applied in a vertical direction.

10. The liquid crystal display of claim 9, wherein a fringe field is generated in at least one portion of the electric field.

* * * * *